(12) United States Patent
Hansson et al.

(10) Patent No.: US 8,069,375 B2
(45) Date of Patent: Nov. 29, 2011

(54) COVER LOVER

(75) Inventors: Daniel Hansson, Lund (SE); Mikael Caleres, Lund (SE)

(73) Assignee: Kreativtek Software Lund AB, Lund (SE)

( * ) Notice: Subject to any disclaimer, the term of this patent is extended or adjusted under 35 U.S.C. 154(b) by 320 days.

(21) Appl. No.: 12/330,199

(22) Filed: Dec. 8, 2008

(65) Prior Publication Data

US 2010/0146339 A1   Jun. 10, 2010

(51) Int. Cl.
*G06F 11/00* (2006.01)
(52) U.S. Cl. ............... 714/46; 714/25; 714/32; 714/33; 714/703
(58) Field of Classification Search .................. 714/25, 714/32, 33, 46, 703
See application file for complete search history.

(56) References Cited

U.S. PATENT DOCUMENTS

| 5,542,043 | A | * | 7/1996 | Cohen et al. | 714/32 |
| 6,212,675 | B1 | * | 4/2001 | Johnston et al. | 717/107 |
| 6,829,731 | B1 | * | 12/2004 | LaFauci et al. | 714/33 |
| 2003/0233600 | A1 | * | 12/2003 | Hartman et al. | 714/32 |
| 2006/0150025 | A1 | * | 7/2006 | Hughes | 714/38 |
| 2007/0168727 | A1 | * | 7/2007 | Fournier et al. | 714/25 |
| 2010/0083053 | A1 | * | 4/2010 | Narayanan et al. | 714/46 |

* cited by examiner

*Primary Examiner* — Charles Ehne
(74) *Attorney, Agent, or Firm* — Young & Thompson

(57) ABSTRACT

The present invention relates to a method, device, and system for managing verification of configurable hardware and software. The solution according to the present invention solves this by applying a matrix-like method of handling test and verification parameter combinations and interacting with a user using a browser like interface for simple and fast selection of coverage.

5 Claims, 11 Drawing Sheets

FIG 6.

101 Find single option settings for which all configurations fail. List the failing configuration numbers for each such single option setting.

102 Find combinations of N option settings for which all configurations fail, starting with N=2 and ending with N set to the maximal number of possible option settings In a single configuratin. List the failing configuration numbers for each such configuration.

103 Sort the list: first all single option settings, followed by combinations of N option settings in order of N. Within each category (i.e. order of N) most number of configuration failures comes first.

104 Starting from the top of the list go through the list and remove those option settings that have a configuration failure list which is a subset of the configuration failure list list of another opton setting higher up on the list

105 Produce a list of configurations where each configuration only verifies one of the candidate option settings in list produced above

COVER LOVER

TECHNICAL FIELD

The present invention relates to techniques for ensuring good verification coverage of options in configurable hardware, computer programs, computer networks or any other system that comprise options of some sort. More specifically, the present invention relates to a method and apparatus that measures and displays verification coverage and test result of test suites aimed at verifying such options.

Also, the present invention relates to a method and apparatus that diagnoses test failures in such test suites in order to conclude which combinations of options which are faulty. This method and apparatus for test failure diagnosis may also be used to conclude which combinations of file versions those are faulty in non-configurable systems.

BACKGROUND OF THE INVENTION

Systems where Only a Sub-Set May be Verified

Most computer programs have options that allow the user to adapt the program according to, for example, user preferences or available computer hardware. Before shipping it, the developer of the computer program must not only verify all options, but also verify all combinations of all options in order to secure that the program works for all user settings. This task grows quickly with the number of options and, in the end, becomes so large that it is impossible to verify all combinations as testing time has practical limits. For this reason the developer is forced to verify a sub-set of all combinations. The question then arises what sub-set of combinations should be verified in order to achieve good verification coverage.

The same problem exists with configurable hardware, which is hardware that may be configured by the user. For example, an integrated circuit developer may purchase a configurable microprocessor which may have many configuration options such as the sizes of the caches, the number of interrupts and the memory bus width. Before shipping, the developer of the configurable microprocessor must verify all options and all combinations of options, which is also a task that quickly becomes too large as testing time has practical limits.

The same problem also exists in compatibility testing of computer systems where various programs, computers, routers etc are tested together in order to verify compatibility. The number of combinations quickly grows with the number of programs, computers and routers etc. In the end this task also becomes too large as testing time as practical limits.

To summarize, the problem exist in any system that contains many options, units, states or signals that need to be tested in combination with each other and where the total number of combinations is too large, forcing the developer to verify a sub-set. The question is what sub-set of combinations should be verified in order to achieve good verification coverage.

Pair-Wise Testing

Pair-wise testing is an existing method of selecting such a sub-set of combinations when the total number of combinations is too large to test. With pair-wise testing you limit the testing to all combinations of each option pair. E.g. if you have 4 Boolean options you don't verify exhaustively all 16 combinations, instead with pair-wise testing you only verify each pair of options. To fully verify a pair of Boolean options requires the following 4 combinations:
option1=false and option2=false
option1=false and option2=true
option1=true and option2=false
option1=true and option2=true As you may verify several pairs in parallel (e.g. option1 and option2 may be fully tested in parallel with option3 and option4) the end result is a shorter list of option combinations to verify. In this example with 4 Boolean options it would require only 6 combinations of options for full pair-wise testing, compared with 16 combinations for exhaustive testing. As the number of options grows the benefit of doing pair-wise testing becomes even larger.

Various studies have shown that pair-wise testing may catch the majority of bugs despite only focusing on a small subset of combinations, This makes pair-wise testing a cost-effective way of finding bugs.

N-Wise Testing

N-wise testing is taking the idea of pair-wise testing a step closer to exhaustive testing (exhaustive testing is to verify all combinations). Whereas, pair-wise testing (or 2-way testing) only verifies all pairs of option settings, 3-way testing (which is N-wise testing where N is 3) verifies all triplets of option settings. As the N in N-ways testing grows the number of combinations grows rapidly. Already achieving full coverage of 3-way testing is in many cases too big a task as the testing time for that many combinations is not available. A more focused approach is necessary for higher orders of N-way testing (3-ways and above).

A Method and Apparatus for Measure and Display of Verification Coverage and Test Result Hence, what is needed is a method for producing a test suite with good verification coverage for higher order of N-way testing in a focused way that prevents the number of combinations to increase dramatically. In order to do that, a method and apparatus is needed that may measure and display verification coverage for higher orders of N-way testing in a way that allows the user to focus on a desired sub-set of combinations. Also, the same method and apparatus is needed to display the test result for higher orders of N-way testing.

A Method and Apparatus for Root-Causing Test Failures to Find Faulty Configurations When a bug is found then typically many different combinations of options will cause tests to fail, even though the bug may only be linked to one specific combination of options (a "combination of options" is also referred to as a "configuration"). In cases with many options it is hard to detect commonalities between failing tests and also hard to distinguish between the cause and consequences. The verification engineer has to spend a lot of time root-causing the test failures before being able to conclude which configurations are faulty. Hence, what is needed is a method and apparatus that analyses all test failures and points out the root causes, i.e. the faulty configurations.

SUMMARY OF THE INVENTION

Systems with configuration options must be tested by the developer with all possible combinations of options settings prior to delivery to its customer. This in order to guarantee that no matter what the customer select the system will work. However, testing all combinations is often a task that is too large to be practical which is why a sub-set of all options have to be selected. The question is then how to select such a sub-set. Also the number of combinations may be too large to even visualize or measure, which makes it harder to select a sub-set of options to test.

This invention provides a method and device for displaying and measuring the test result and verification coverage in conjunction with configuration option testing. The invention gives the user a browser-like experience when examining large data sets of test results and/or verification coverage, allowing the user to examining a sub-set of the data at a time in a logical fashion.

Also, the invention provides a method and device for diagnosing test results and to provide a root-cause analysis in order to point out what combinations of configuration options that are faulty. The same algorithm may also be use to diagnose test failures in a non-configurable system in order to conclude what combinations of file versions that are faulty.

This is provided in a number of aspects according to the present invention, in which a first is a method for displaying and measuring verification coverage for a test suite aimed at verifying configuration options, comprising the steps of:
- receiving a list of configuration options that the user wishes to examine;
- receiving a list of combinations of configuration options that the user will test;
- analyzing the lists and displaying the verification coverage for each combination of two configuration options;
- analyzing the lists and measuring the verification coverage for all combinations and presenting the result as a measurable, e.g. a number between 0.00 and 100.00%;
- receiving a signal from a user indicating settings on some of the configuration options, which the user wishes to focus on;
- analyzing the lists and displaying the verification coverage for each remaining combination of two configuration options, given that the other configuration options have been set to specific values;
- analyzing the lists and measuring the verification coverage for all remaining combinations, given that the other configuration options have been set, and presenting the result as a measurable, e.g. a number between 0.00 and 100.00%;
- updating at least one memory unit area with a result of the analysis.

A second aspect of the present invention is provided, a method for handling test result for a test suite aimed at verifying configuration options, comprising the steps of:
- receiving a list of configuration options that the user wishes to examine;
- receiving a list of combinations of configuration options that the user has tested;
- receiving a list of test results, for instance containing one pass or fail message for each combination of configurations that was tested;
- analyzing the lists and displaying the test result for each combination of two configuration options;
- analyzing the lists and measuring the test result for all combinations and presenting the result as a measurable, e.g. a number between 0.00 and 100.00%;
- receiving a signal from a user indicating settings on some of the configuration options, which the user wishes to focus on;
- analyzing the lists and displaying the test result for each remaining combination of two configuration options, given that the other configuration options have been set to specific values;
- analyzing the lists and measuring the test result for all remaining combinations, given that the other configuration options have been set, and presenting the result as a measurable, e.g. a number between 0.00 and 100.00%;
- updating at least one memory unit area with the analysis result of the test result.

A third aspect of the present invention is provided, a method for displaying and measuring illegal combinations for a test suite aimed at verifying configuration options, comprising the steps of:
- receiving a list of configuration options that the user wishes to examine;
- receiving a list of combinations that are illegal
- analyzing the lists and displaying for each combination of two configuration options whether that combination is illegal;
- analyzing the lists and measuring the illegal combinations over all combinations and presenting the result as a measurable, e.g. a number between 0.00 and 100.00%
- receiving a signal from a user indicating settings on some of the configuration options, which the user wishes to focus on;
- analyzing the lists and displaying whether each remaining combination of two configuration options are illegal, given that the other configuration options have been set to specific values;
- analyzing the lists and measuring the illegal combinations for all remaining combinations, given that the other configuration options have been set, and presenting the result as a measurable, e.g. a number between 0.00 and 100.00%
- updating at least one memory unit area with the analysis result of the test result.

A fourth aspect of the present invention is provided, a method for handling test result for a test suite aimed at verifying file versions, comprising the steps of:
- receiving a list of file versions that the user wishes to examine;
- receiving a list of combinations of file versions that the user has tested;
- receiving a list of test results, for instance containing one pass or fail message for each combination of file versions that was tested;
- analyzing the lists and displaying the test result for each combination of two file versions;
- analyzing the lists and measuring the test result for all combinations and presenting the result as a measurable, e.g. a number between 0.00 and 100.00%;
- receiving a signal from a user indicating settings on some of the file versions, which the user wishes to focus on;
- analyzing the lists and displaying the test result for each remaining combination of two file versions, given that the other files have been set to specific;
- analyzing the lists and measuring the test result for all remaining combinations, given that the other file versions have been set, and presenting the result as a measurable, e.g. a number between 0.00 and 100.00%;
- updating at least one memory unit area with the analysis result of the test result.

The method according to the second aspect, further comprising the steps of:
- receiving the analysis result of the test result from the second aspect of the present invention;
- analyzing this input data and creating a list of all option combinations that are only present in failing tests and never present in passing tests
- removing any option combination from this list for which there is another option combination in the list consisting of a sub-set of the same options and that is present in the same failing tests
- removing any option combination from this list that is present in a sub-set of the failing tests of another option combination in the list producing a test suite that will test one potential faulty option combination per test and thus when run the root-cause will be concluded;

updating at least one memory unit area with a result of the analysis.

The method according to the fourth aspect, further comprising the steps of:

receiving the analysis result of the test result from the fourth aspect of the present invention;

analyzing this input data and creating a list of all file version combinations that are only present in failing tests and never present in passing tests removing any file version combination from this list for which there is another file version combination in the list consisting of a sub-set of the same file versions and that is present in the same failing tests removing any file version combination from this list that is present in a sub-set of the failing tests of another file version combination in the list producing a test suite that will test one potential faulty file version combination per test and thus when run the root-cause will be concluded;

updating at least one memory unit area with a result of the analysis.

The method according to the first aspect, further comprising the steps of receiving a list of configuration options that the user wishes to examine receiving a list of combinations of configuration options that the user will test receiving a list of values of N for which the user wishes to measure the N-way verification coverage receiving a number from the user indicating how many different views that should be measured per value of N generate the views that should be measured for each N receiving the analysis result from the first aspect of the present invention for each of these views updating at least one memory unit area with a result of the analysis The method according to the second aspect, further comprising the steps of receiving a list of configuration options that the user wishes to examine receiving a list of combinations of configuration options that the user will test receiving a list of values of N for which the user wishes to measure the N-way test results receiving a number from the user indicating how many different views that should be measured per value of N generate the views that should be measured for each N receiving the analysis result from the second aspect of the present invention for each of these views updating at least one memory unit area with a result of the analysis The method according to the third aspect, further comprising the steps of receiving a list of configuration options that the user wishes to examine receiving a list of combinations of configuration options that the user will test receiving a list of values of N for which the user wishes to measure the N-way illegal configurations receiving a number from the user indicating how many different views that should be measured per value of N generate the views that should be measured for each N receiving the analysis result from the third aspect of the present invention for each of these views updating at least one memory unit area with a result of the analysis Another aspect of the present invention is provided, a device arranged with at least one processing unit, at least one memory unit, wherein the device is arranged to perform at least one method of first to ninth aspects of the present invention.

Yet another aspect of the present invention is provided, a system comprising at least one processing device according to the tenth aspect of the present invention, user interface unit, and communication unit.

Still another aspect of the present invention is provided, a computer program stored in a computer readable storage medium, arranged to operate instruction sets performing at least one method of first to ninth aspects of the present invention.

BRIEF DESCRIPTION OF THE DRAWINGS

In the following the invention will be described in a non-limiting way and in more detail with reference to exemplary embodiments illustrated in the enclosed drawings, in which the following Figs shows examples and embodiments of the present invention:

FIG. 6 Algorithm for Root-Causing Test-Failures to find faulty configuration according to the present invention;

DETAILED DESCRIPTION OF PREFERRED EMBODIMENTS

A Method and Apparatus for Measure and Display of Verification Coverage and Test Result This invention provides a method of displaying and measuring verification coverage and test results for combinations of options. The challenge with verifying all combinations of options, i.e. configurations, is that the number of configurations grows quickly as the number of options grows. In many systems it is not only impossible to verify all configurations, it is also impossible to display and measure the configurations in a useful way due to the vast amount of configurations. This invention provides a novel method of solving this problem by putting in place a mechanism that allows the user to explore large configuration spaces (a configuration space is the total list of all possible configurations) in a way that has a similar user-experience to using an internet web browser.

Figure 1:
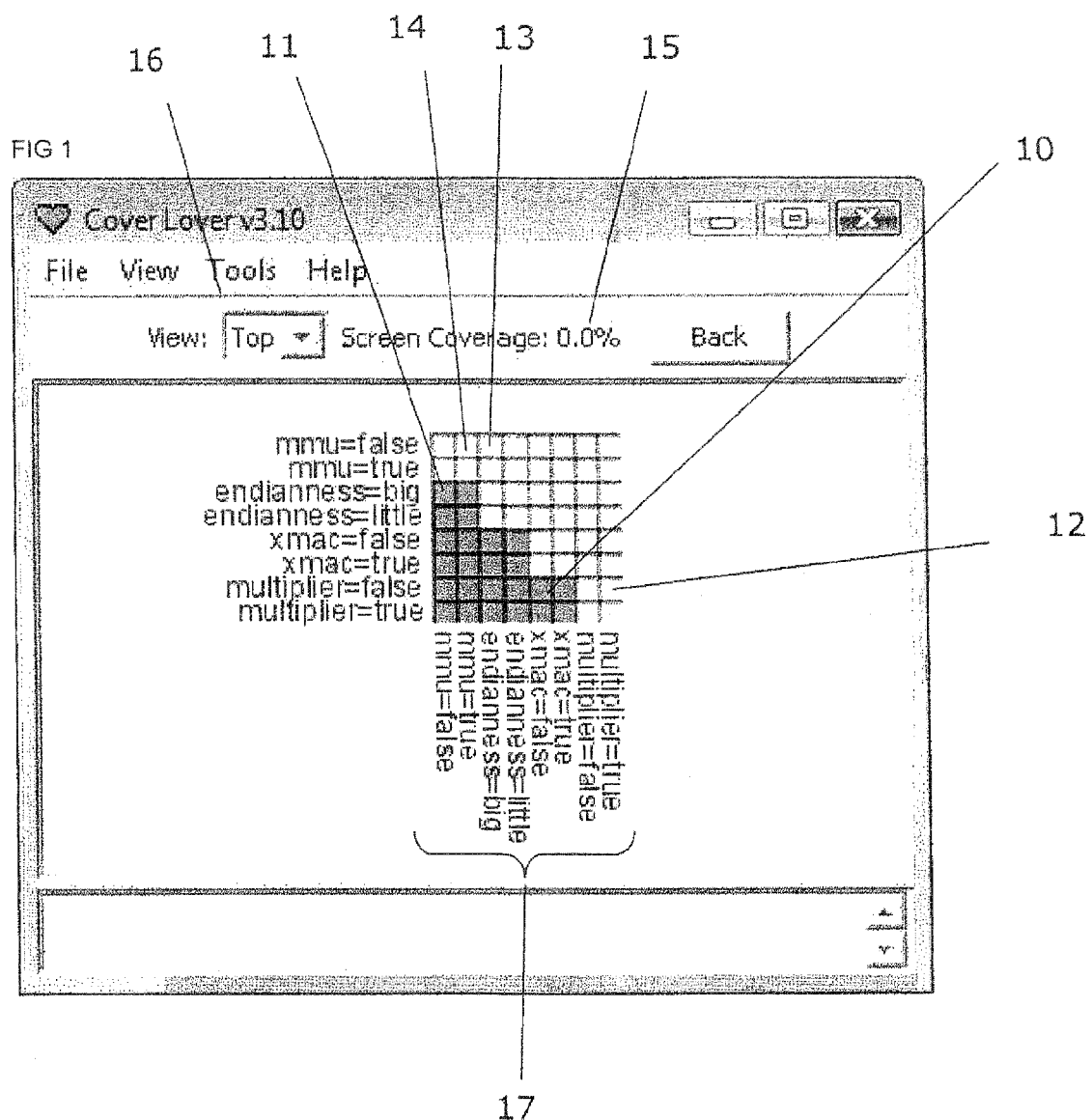
FIG. 1 Example of Option Verification Coverage at the top level according to the present invention.

First of all, the options are displayed in a similar way to a distance table in a road atlas. All options are listed twice, once on the x-axis and once on the y-axis and any point in the graph correspond to the configuration reflected by the x- and y-axis. FIG. 1 illustrates this with an example with 4 options where each option may be set to two different values. Note that each value of each option must be listed on both axis. E.g. the option "mmu" may be set to either "true" or "false" and consequently both "mmu=true" and "mmu=false" must be listed on both the x- and y-axis. In FIG. 1, each grey square (refer to 10) corresponds to a configuration, where the color grey means that the configuration is not covered by any test. E.g. the grey square in the upper-left corner (refer to 11 in FIG. 1) corresponds to the configuration "endianness=big and mmu=false" and this configuration is not covered by any test (which is indicated by the color grey). This is the method and apparatus for displaying the verification coverage. More information about this follows in this section.

The white squares (12 in FIG. 1) are configurations that are either duplications of the grey squares (10) (e.g. "mmu=false and endianness=big", 13 in FIG. 1, is a duplication of "endianness=big and mmu=false", 11 in FIG. 1) or nonsensical (e.g. "mmu=true and mmu=false", 14 in FIG. 1, which is an impossible configuration as you cannot set one option to two different values at the same time). The white squares are consequently ignored. Achieving 100% coverage means providing tests that cover all non-white squares in FIG. 1.

In the example in FIG. 1 the verification coverage is 0%, which is visualized in two ways: 1) all non-white squares being grey and 2) "Screen coverage" (in FIG. 1) is displayed as being 0%. The "screen coverage" summarizes the coverage of what you currently see on the screen. If all non-white squares are covered then the screen coverage would be 100%. If none of the non-white squares are covered as in FIG. 1 then the screen coverage is 0%. If half of all non-white squares would be covered then the screen coverage would be 50%. The screen coverage is computed by subtracting the number of grey squares (not covered) from the number of non-white squares (the total scope of this view) and then dividing the result with the number of non-white squares, giving you a number between 0 (i.e. 0% covered) and 1 (i.e. 100% covered). This is the method and apparatus for measuring verification coverage. More information about this follows in this section.

In the example in FIG. 1 the "View" is set to "Top" (16 in FIG. 1). The view may be changed to focus on a specific option setting (more about that later), but if it is set to "Top" then no such focus is being examined. The view "Top" consequently means that all option settings combined with all option settings are being considered. This is called pair-wise testing (refer to "BACKGROUND OF INVENTION" for more information regarding pair-wise testing). In order to do pair-wise testing and achieve full coverage then all grey squares must be covered in the "Top" view.

In order to do pair-wise testing and achieve full coverage the user should choose "Cover" (20 in FIG. 2), which results in the following configurations being produced:
Configuration 1: -xmac true-multiplier true-endianness big-mmu false
Configuration 2: -xmac false-multiplier false-endianness big-mmu true
Configuration 3: -xmac false-multiplier true-endianness little-mmu false
Configuration 4: -xmac true-multiplier false-endianness little-mmu true
Configuration 5: -xmac true-multiplier false-endianness little-mmu false
Configuration 6: -xmac true-multiplier true-endianness little-mmu true These 6 configurations are also referred to as 6 tests, because each of these configurations should be tested. This list of tests is referred to as a test suite.

Figure 2:
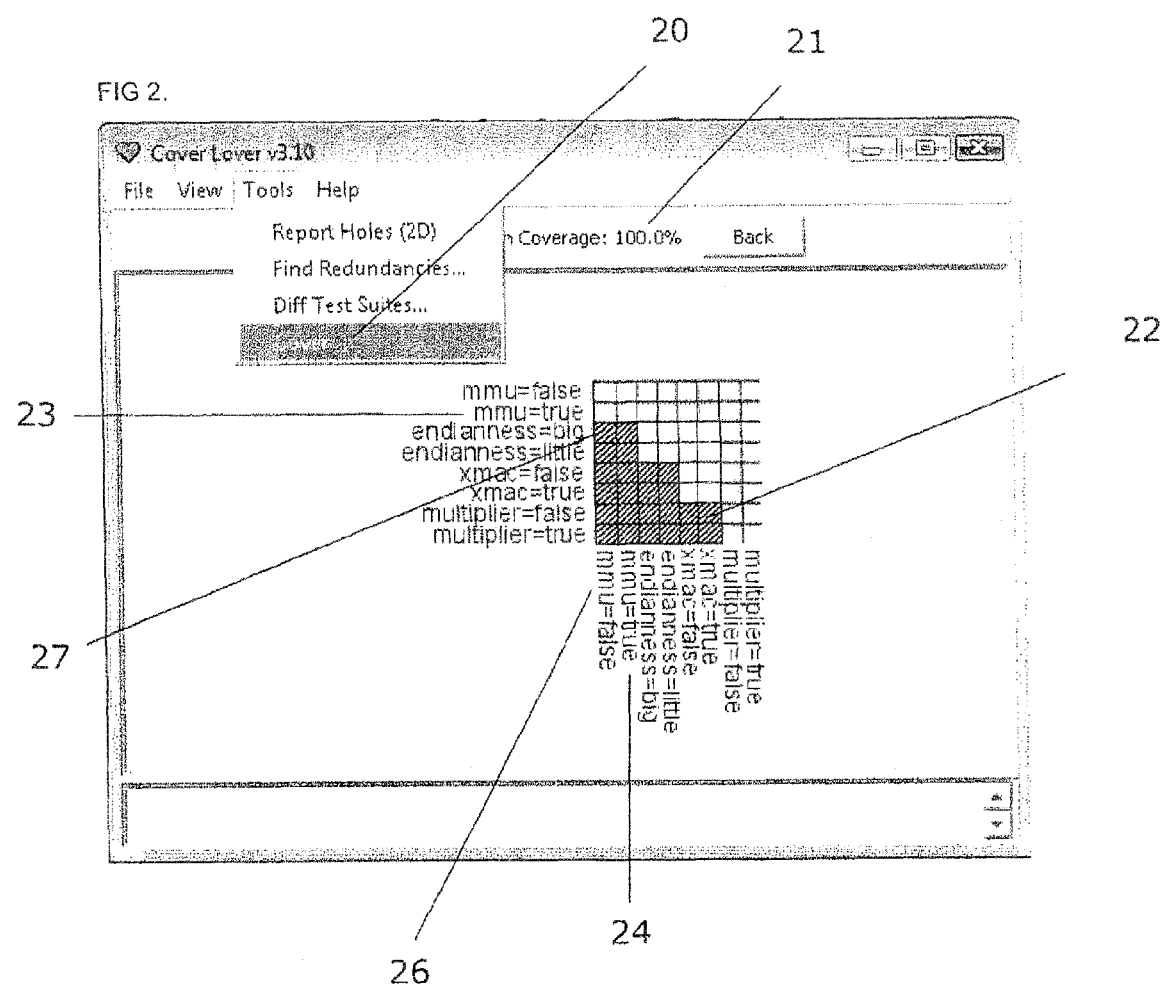
FIG. 2 Example of Covering at the top level according to the present invention.

The 6 tests above achieve 100% coverage in FIG. 2, which is visualised in two ways 1) the screen coverage is now set to 100% (21 in FIG. 2) and 2) all non-white squares are striped (22 in FIG. 2), which symbolises that the configuration has been covered by at least one of the 6 tests.

Up to this point we have showed how pair-wise testing (or 2-way testing) is handled by the invention. Now we are going to show how 3-way testing is handled. The problem with 3-way testing in general is the explosive growth of the test suite length, but this invention handles this in a focused and novel way. It is possible to focus 3-way testing on a limited list of options, which the user knows are important to test, rather than having to go for full 3-way coverage. The user's knowledge is consequently used to create a focused test suite that has partial 3-way coverage of the most important options.

In FIG. 2 the user may click on any item on either axis in order to focus on the 3-way coverage of one option setting. For example, if the user wants to focus on "mmu=true" then the user clicks on the text "mmu=true" on either axis (23 and 24 in FIG. 2), whereby the new view in FIG. 3 appears. The view is now set to "mmu=true" (refer to 33 in FIG. 3). Each square in FIG. 3 now represents a 3-way configuration, two of the options coming from the x- and y-axis and one option coming from the view. E.g. the non-white square most to the upper-left (34 in FIG. 3) represents the configuration "xmac=false and endianness=big and mmu=true", where "xmac=false" comes from the y-axis (35 in FIG. 3), "endianness=big" comes from the x-axis (36 in FIG. 3) and "mmu-true" comes from the view (33 in FIG. 3). Also note in FIG. 3 that the mmu-option is no longer on the x- or y-axis' as for this view it is set to mmu=true for all squares.

Figure 3:
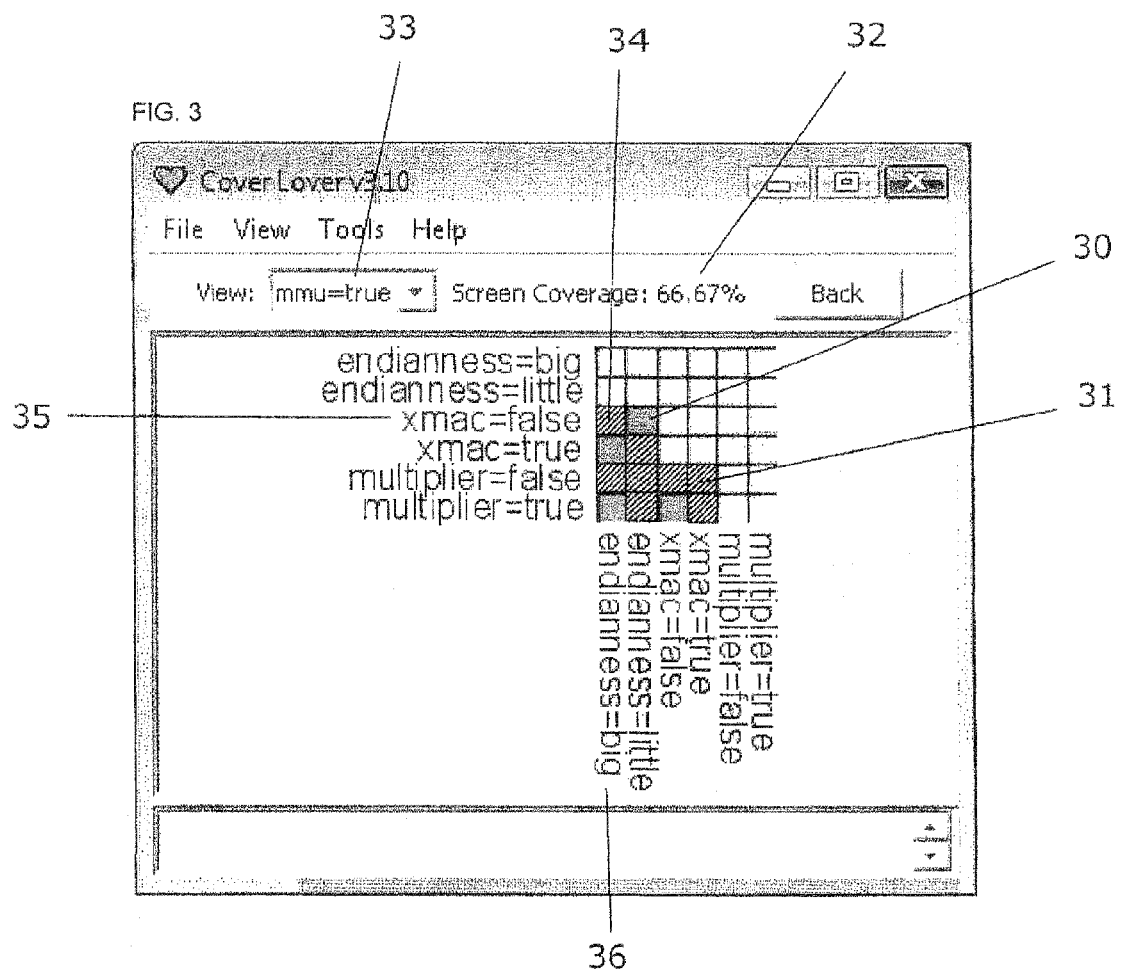
FIG. 3 Example of view "mmu=true", not fully covered according to the present invention.
Figure 4:
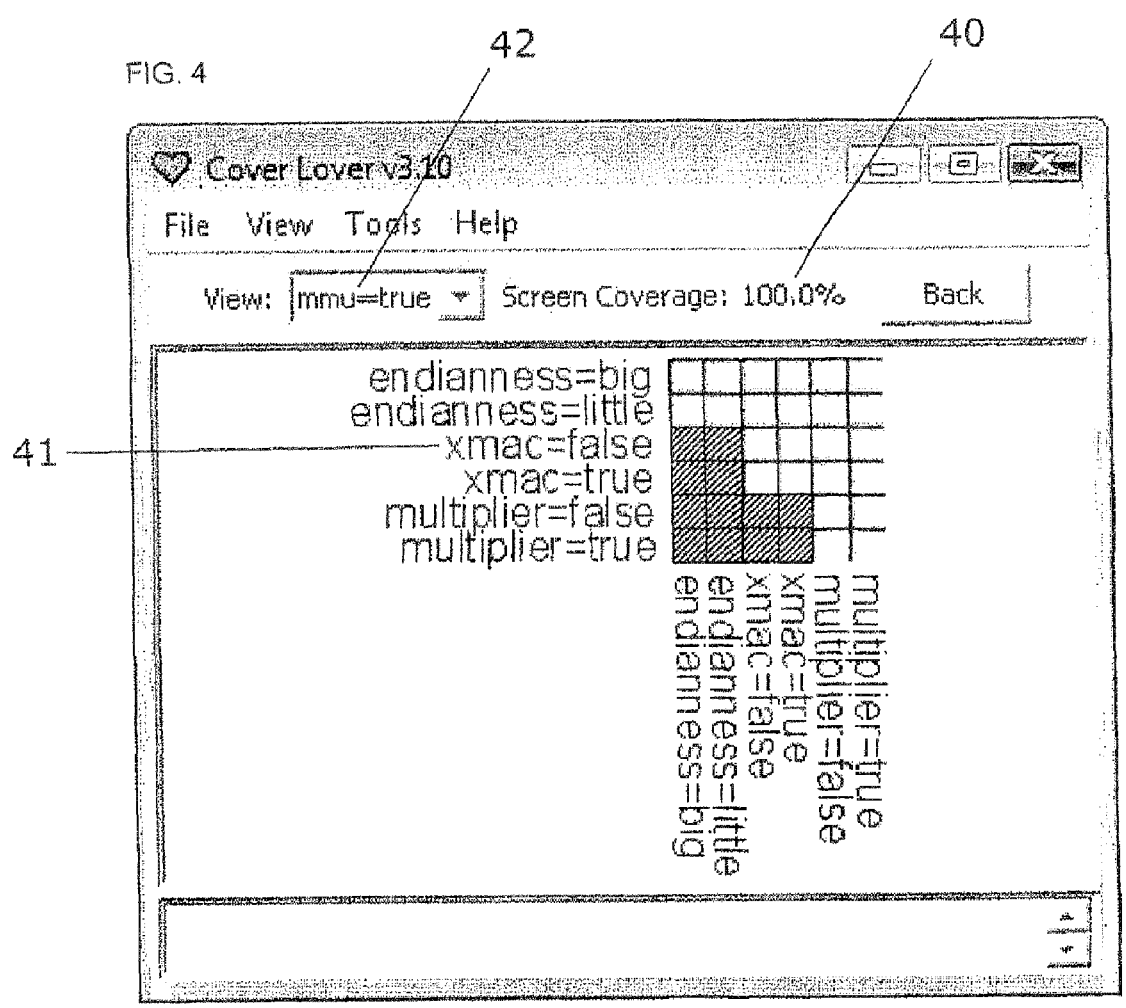
FIG. 4 Example of view "mmu=true", fully covered according to the present invention.

The coverage in FIG. 3 is only 66.67% (32 in FIG. 3) because the coverage was generated for the top view. Having 100% coverage on the top view (essentially the 2-way view) does not automatically give you the same coverage in a 3-way view. In order to achieve full coverage in the view "mmu=true" in FIG. 3 then the user must select "Cover" in the same way as was previously done in 21 in FIG. 2. Selecting "Cover" will achieve full coverage in the view "mmu=true", as is shown in 40 in FIG. 4 by producing the following additional tests on top of those 6 tests that were previously generated in the top view:
Configuration 7: -mmu=true-xmac=false-multiplier=true-endianness=little
Configuration 8: -mmu=true-xmac=true-multiplier=true-endianness=big Note that all tests generated in the view "mmu=true" contains the option setting "mmu=true".

If the user wants to achieve full 3-way coverage of the entire option mmu for all its values, then the user must go back to the top view (FIG. 2), then click "mmu=false" (26 in FIG. 2) and choose cover (21 in FIG. 2). Full 3-way coverage of the mmu option means 100% coverage must be achieved in both the view "mmu=false" and the view "mmu=true".

If the user wants to achieve full 3-way coverage for all options then the view for each option setting must be fully covered. In the example in FIG. 1, this means that 8 views must be fully covered (mmu=false, mmu=true, endianness=little, endianness=big, xmac=false, xmac=true, multiplier=false and multiplier=true as seen in 27 in FIG. 2) in order to achieve full 3-way coverage of all options. This invention consequently does not put any limits on what the user may cover. Anything from full 3-way coverage of all options to partial 3-way coverage of only one option setting (e.g. mmu=true) is possible. This is the key idea in this invention: allowing the user to find the right balance between the level of coverage and the test suite length, based on the user's own knowledge of the system under test.

The invention is not limited to 3-way coverage either. By clicking on the text "xmac=false" (41 in FIG. 4) the user would enter the view "xmac=false and mmu=true" (as we were in the view "mmu=true" (see 42 in FIG. 4) before the click), which is a 4-way view, where two of the options come from the view ("xmac=false and mmu=true") and the other two options comes from the x- and y-axis'. The invention supports N-way visualisation and measurement where the maximal value of N is not limited by the invention. Any value of N may be explored by clicking on the related parts on the axis until the desired view is found. The maximal value of N is only limited by how many options the system has, e.g. if the system under test has 10 options then the maximal value of N is 10. In this example 10-way coverage is the same as exhaustively testing every single configuration. The invention has no limitations; it may handle any finite number of options and all its configurations. The invention allows the user to click in the way described above to navigate around the entire configuration space, giving the user a similar experience to using a web browser, which also has no limits of the amount of data it may explore by navigating around. The invention allows total freedom to navigate around the entire configuration space and examine verification coverage and test results. All this may be done with complete precision, e.g. if just one specific configuration is of interest in a 100-way configuration space (i.e. the system under test has 100 options) then the user may navigate to this one specific configuration.

There is a second way of navigating around the configuration space. As previously mentioned, the first way is to click on the desired option setting on either the x- or y-axis. The second way is to click on a non-white square. As each square represents two options settings (e.g. "endianness=big and mmu=false" (27 in FIG. 2) this means that the N in N-way is increased by 2 for each click, whereas the first way of navigating, by clicking on an axis value, only increases N by 1. For example, starting in the top view (i.e. 2-way view) in FIG. 2 and clicking on the square "endianness=big and mmu=false" (27 in FIG. 2) takes you directly to a 4-way view, where 2 options are decided by the view ("endianness=big and mmu=false") and 2 options are decided by the x- and y-axis respectively. You consequently go from a 2-way view to a 4-way view in one click by clicking on a square. Being in a 4-way view and clicking on another square would consequently take the user to a 6-way view. For comparison let's consider the first way of navigating, i.e. to click on one desired option setting on either one of the two axis. Starting in the top view (2-way view) in FIG. 2 and clicking on e.g. "mmu=true" (23 in FIG. 2) would take you to the 3-way view in FIG. 3. By clicking on an axis value you consequently increment the N-way view by 1 for each click, but by clicking on a square the user increments the N-way view by 2 for each click.

The invention also visualises and measures test result. As previously explained, the invention shows whether a test covers a certain configuration by setting the corresponding square to striped if it is covered (31 in FIG. 3) and to grey if it is not covered (30 in FIG. 3). However, the invention may also read the test result, which is a file indicating whether each configuration in the test suite passed or failed. If all tests passed that contained the configuration represented by a certain square then this square is marked with dots (50 in FIG. 5). If all tests failed then the square is marked with vertical dashed lines (51 in FIG. 5). If some of the tests passed and some failed then the square is marked with waves (52 in FIG. 5). It is consequently possible to navigate around the entire configuration space to visualise and measure the test result for any configuration, in the same way as it is possible to navigate around the entire configuration space to visualise and measure verification coverage. This is the method and apparatus for displaying the test results.

The invention may also display and measure illegal configurations in the same way as it displays and measures verification coverage and test results. Illegal configurations are visualised as black squares (70, 71 and 72 in FIG. 7). It is consequently possible to navigate around the entire configuration space to visualise and measure illegal configurations. The measurement of illegal configurations is done by dividing the illegal configurations (70, 71 and 72 in FIG. 7) by the total number of configurations to cover.

As mentioned above the invention allows display and measurement of verification coverage, test result and illegal configurations of any configuration. This is true independent of the size of the configuration space. As previously mentioned, the invention may be used to examine any single configuration in a complex highly configurable system. The invention may also be used to measure the average N-way verification coverage, test result and illegal configuration for each N in highly configurable systems, whose configuration space is too large to allow complete measurement of all configurations. Imagine a test suite that verifies a system with 8 options, which may be set to 10 values each, for which the user wants to know the full (N=8) verification coverage. This means it is necessary to check each possible configuration (in total $10^8$ configurations) to see if it is covered by a configuration in the test suite. Imagine it is possible to check 100 configurations per second, then this exercise would still take $10^6$ seconds, i.e. more than 11 days, just for a measurement. This is too long. However, it is nevertheless important to know what level of verification coverage the user-generated test suite provides in order to be able to judge if the coverage is appropriate. The solution is to use the invention to measure a limited user-specified number of views for each N and present the average from these measurements as the estimated measurement result for each N.

E.g. imagine the user-specified number of views (called the N-way sample rate) for each N is set to 1 and the user wishes to measure the 3-way verification coverage (i.e. N=3) in the configurable system shown in FIG. 3. This view shows the 3-way verification coverage (32 in FIG. 3) for the option setting "mmu=true", which is the view (to 33 in FIG. 3), but it doesn't show the full 3-way verification coverage. For the full 3-way verification coverage we would need the 3-way verification coverage from the following views as well: mmu=false, endianness=big, endianness=little, xmac=false, xmac=true, multiplier=false and multiplier=true. However in this example the user-specified number of views for each N is set to 1, which means we will take the verification coverage from just this view, i.e. 66.67% (32 in FIG. 3) and present it as the estimated average 3-way verification coverage. This is a faster but less precise method of producing the measurement results. Note that the precision increases with higher values of the user-specified N-way sample rate.

Figure 11:
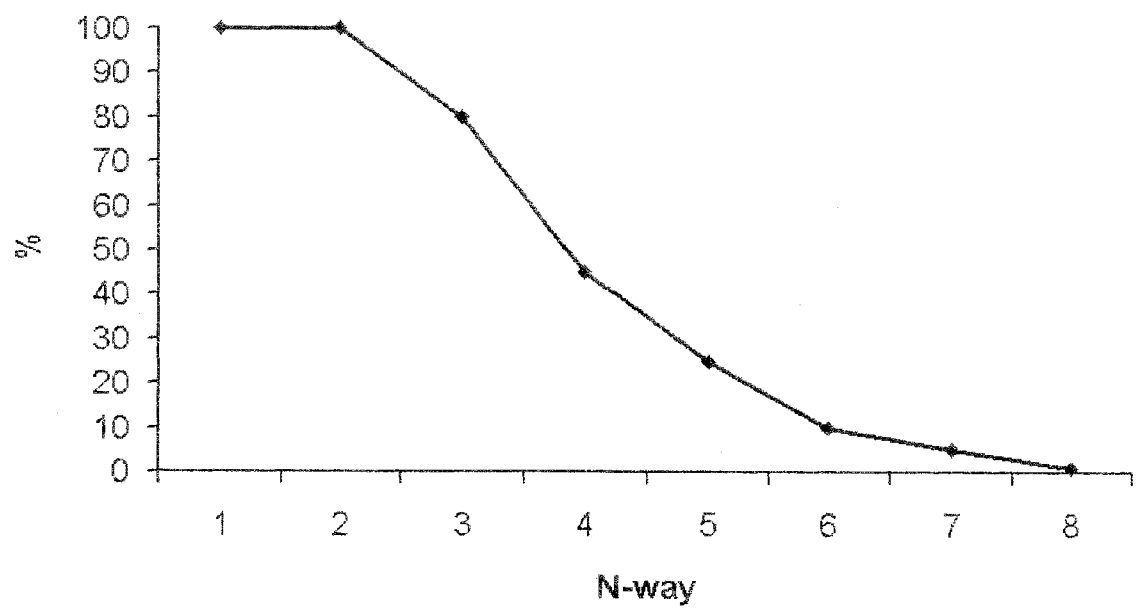
FIG. 11 Example of N-way verification coverage according to the present invention.

Coming back to the example mentioned earlier with 8 options with 10 values each it is now possible to produce a graph over the complete N-way verification coverage using this method. With the user-specified N-way sample rate set to 1 it is possible to produce an estimate for each value of N with just 7 view measurements to produce the graph in FIG. 11. The 7 view measurements required is one for each N (as N-way sample rate is set to 1) from N=2 until N=8. Note that with the N-way sample rate set to 1 the 2-way verification coverage is completely measured as the full 2-way coverage is available in one view (the Top view). However the verification coverage for 3-way to 8-way in FIG. 11 are estimates. The estimates becomes less certain with higher values of N as the number of option combinations increase, but still only 1 view is measured per N. However, in most algorithms used to create the test suites (such as for example random generation) the generated configurations are spread in a uniform way, which means the verification coverage does not differ that much between different views of the same order of N.

The selection of which views to sample is random walk, i.e. for each N an option setting is randomly selected and added to the list of option settings used to sample the previous lower order of N. E.g. The option setting "mmu=true" was randomly selected as the view to sample 3-way verification coverage (refer to FIG. 3) in this example where the N-way sample rate is set to 1. In order to measure the 4-way view a new option setting is randomly select, e.g. "endianness=big", which means the 4-way view will be "mmu=true and endianness=big". If the sample rate is set to 2 then there will be two threads of parallel random walks, one for each sample view. The purpose of using random walk is to preserve a logical relationship between different orders of N, which is useful when measuring test results or illegal configurations instead of verification coverage. The reason being is that it order to show 4-way failures it is necessary to filter away those failures which are 3-way failures, which means there has to be a natural relationship between N=4 and N=3 and not just completely random views. The same is true when showing 4-way illegal configurations, it is necessary to filter away all 3-way illegal configurations to get an accurate measurement of 4-way illegal configurations.

Note that this invention does riot include the test suite generation. The test suite generation may be done by a dedicated deterministic algorithm or just generated with a completely random algorithm, or a combination of both. This invention is limited to measuring, displaying and debugging the verification coverage, the test results and the illegal configurations. The test suite generation is not relevant to this patent.

Furthermore, the invention does not comprise the visualisation of options and their possible configurations in the simple top view (refer to FIG. 1), which is only useful for visualisation and measurement of pair-wise (2-way) coverage. What the invention does provide is a novel mechanism to visualise and measure the N-way configuration space for N larger than 2 (refer to example FIG. 3, which shows the 3-way-view "mmu=true").

In summary, the invention provides a method and apparatus to visualise and measure the verification coverage and test results of configurations in systems where the number of options is so large that it is not possible to verify all configurations. The invention provides a method and apparatus to navigate around the coverage space and allows the user to examine a sub-set of all configurations. The invention also covers visualisation and measurement of illegal configurations in the same way as it does for verification coverage and test results.

A Method and Apparatus for Root-Causing Test Failures to Find Faulty Configurations This invention provides a method and apparatus for root-causing test failures in order to conclude which configurations which are faulty. The invention provides a novel method of identifying the configurations that most likely are the faulty ones and which are most likely to be causing the detected failures. Identifying the most likely faulty configurations saves a lot of debug time compared with manually looking at the failing tests. This invention does not provide an analysis that is always correct, but it is correct in most cases thus saving a lot of time by providing the initial analysis. The final analysis must still be made by human interaction.

Figure 5:
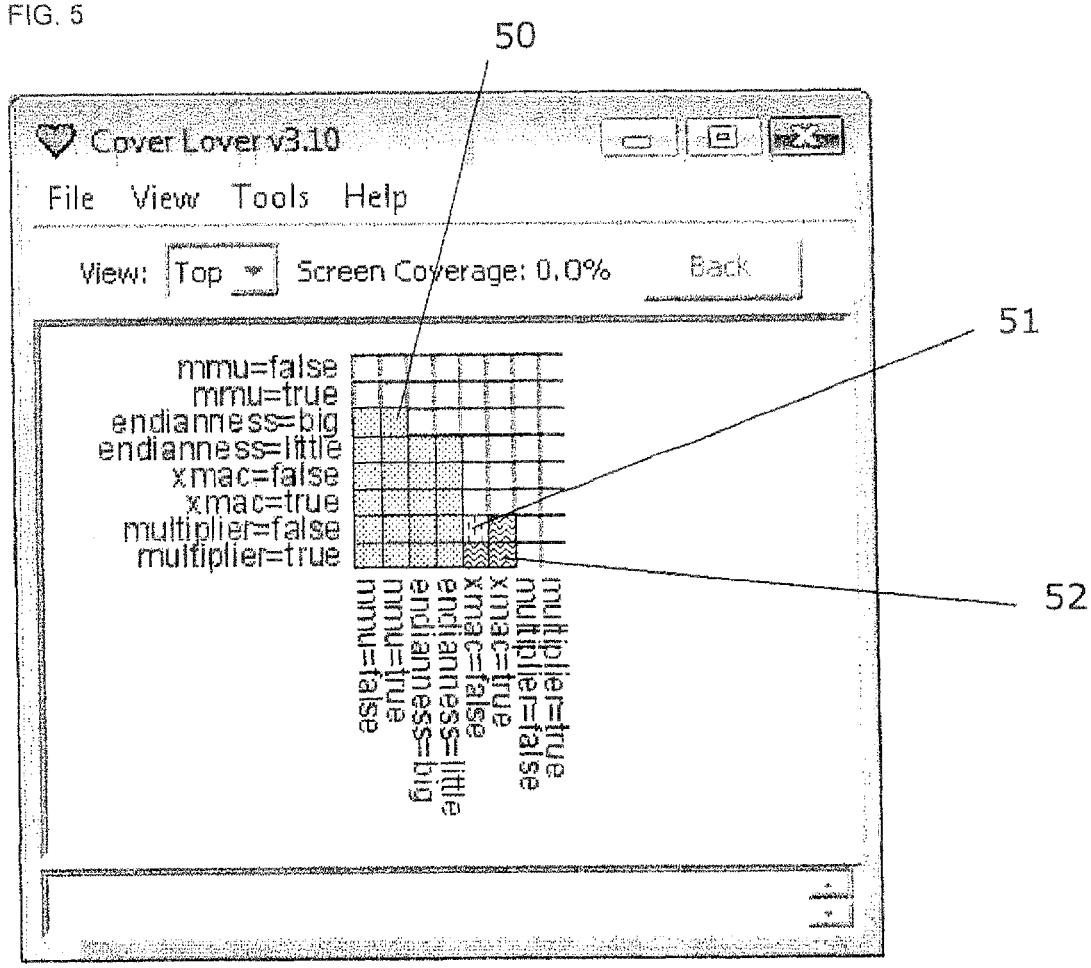
FIG. 5 Example of Test result visualization according to the present invention.

The test result may be visualised as shown in FIG. 5, which is an example where one combination of option settings always fail (51 in FIG. 5) and is consequently marked with dashed vertical lines. Some combinations of option settings are marked with waves (52 in FIG. 5) which means that for these combinations of options settings there are both test passes and test failures. The remaining squares all pass and are consequently marked with dots (50 in FIG. 5).

Combinations of options settings that are only present in failing tests (51 in FIG. 5) may be so for two reasons: either 1) the configuration the square represents is faulty and consequently causes all tests where it is included to fail or 2) the configuration just happens to be present in failing tests, which fail due to other configurations being part of the same test. This invention provides a novel method of distinguishing the configurations that are most likely the root-causes from those that are not.

The invention is based on two ideas regarding combinations of option settings that are only present in failing tests:

1. The fewer common option settings there are in a list of failing configurations the more likely the common option setting is the one containing the root-cause bug. If a list of configurations fail that contains few common option settings (e.g. configurations 6 and 7 fail and both contains the common option setting "mmu=true") then these few common option settings are more probable to contain the root-cause bug than a list of failing configurations with more common option settings, provided that 1) the shorter list of common option settings is a subset of the longer list of common option settings and 2) the list of failing configurations is the same. E.g configurations 6 and 7 are failing and both contain the option settings mmu=true and xmac=true. However xmac=true is also part of configuration 8 which works, in which case the root-cause bug is narrowed down to be present in of these two combinations of option settings 1) "mmu=true" alone or 2) "mmu=true and xmac=true". As "mmu=true" is the shortest list of common option settings and a subset of the second option setting, it is the more likely option setting containing the root-cause bug.

2. The common option setting being part of most failing configurations is more likely the option setting containing the root-cause bug. If one option setting causes a series of configurations to fail and a second option setting causes the same series of configurations to fail, plus one or more additional configurations, then the second option setting is more likely the option setting containing the root-cause bug. The second option setting may explain all the failures of the first option setting, but the opposite is not true due to the additional failing configurations that is only present in the second option setting. E.g. if the option setting "endianness=big" is present in the failing tests no 10, 11 and 12 and the option setting "xmac=true" is present in the failing tests no 10 and 11 then "xmac=true" may be removed as it is more likely that the root-cause bug is associated with the "endianness=big" option setting.

The algorithm flow is shown in FIG. 6. First (Refer to 101 in FIG. 6) find all single option setting for which all tests fail (note that "tests" here means "configurations" and a failing tests means a configuration, which has been verified to be not working). One example would be if all tests (i.e. configurations) would fail when containing the option setting "mmu=true". Then list the failing test numbers for each such single option setting, e.g. if test number 6 and 7 failed then the first entry in the list should now read "Option setting: mmu=true, test failures: 6,7"

Next step (refer to 102 in FIG. 6) is to find all configurations consisting of 2 options settings (e.g. "mmu=true and endianness=big") for which all tests fail and remember the numbers of the failing tests and add it all to the list. This continues with looking for configurations containing 3 common option settings up until N common option settings, were N is the maximal number of option settings allowed in a configuration. For example let's say that test 6 and 7 fail and contain the common option setting "mmu=true and endianness=big" which option setting is never part of a configuration for which all tests passes. Furthermore in this example test 4 fail which contain "multiplier=true and xmac=true" (which also is never part of a passing configuration) and tests 4 and 6 fail with the common always failing option setting "xmac=true and endianness=little". Consequently the list of failures would now look like this:

1. Option setting: mmu=true, Test Failures: 6,7
2. Option setting: mmu=true and endianness=big, Test Failures: 6,7
3. Option setting: multiplier=true and xmac=true, Test Failures: 4
4. Option setting: xmac=true and endianness=little, Test Failures: 4, 6

Next step is to sort the list of failures (refer to 103 in FIG. 6). First on the list should be all single option settings followed by all option settings consisting of 2 options, followed by option settings containing 3 options etc. Within each of these categories, the option setting with the highest number of test failures should come first. Using the previous example, the sorted list should now look as below (only number 3 and 4 have changed place due to the number of test failures):

1. Option setting: mmu=true, Test Failures: 6,7
2. Option setting: mmu=true and endianness=big, Test Failures: 6,7
3. Option setting: xmac=true and endianness=little, Test Failures: 4, 6
4. Option setting: multiplier=true and xmac=true, Test Failures: 4

Next step is to remove option settings from the list whose test failure numbers are a sub-set of the test failure numbers of another option setting higher up on the list (refer to 104 in FIG. 6). Using the previous example, option setting number 2 is a sub-set of option setting number 1 because option setting number 1 contains a single option setting which is also present in option setting number 2 ("mmu="true").

Furthermore, configuration 4 above is a subset of configuration 3 as the test failure list for configuration 4 is a subset of the test failure list of configuration 3. Consequently we may remove configurations 2 and 4 in the list above. The result of this step is the following new list:

1. Option setting: mmu=true, Test Failures: 6,7
2. Option setting: xmac=true and endianness=little, Test Failures: 4, 6

The final step (refer to 105 in FIG. 6) is to produce one configuration to test for each option setting in the list above. As only one option setting in the list above is part of any newly generated configuration the cause is known if the configuration fails. In the example above the list contains two option settings, which means we would need to produce two configurations to test. If the first test fails then option setting 1 in the list above is faulty and if test 2 fails then option setting 2 in the list above is faulty.

The way to create a test that only fails for one configuration in the list above is to mark all other configurations in the list above as illegal, which means they would be avoided (to see how this is done please refer to the next chapter "A method and apparatus for deducting if a configuration is illegal"). Also, all combinations of option settings present in any of the failing configurations, but not present in any of the configurations that have been tested OK, must also be marked illegal in the same fashion. E.g. look at the following example of two configurations where one has been tested OK and the other one fails:

1. Configuration tested OK: -banana true-orange true-mango true
2. Configuration test failed: -banana true-orange true-pineapple true In this example the following combination of option settings must be marked illegal as it is only present in a failing configuration:

pineapple=true

The purpose of avoiding option settings that have only been part of failing configurations is to increase the likelihood that we only test one option setting at a time with all other option set to as safe values as possible.

If any of the option settings cannot be tested in isolation because all the illegal combinations mentioned above makes it impossible to create a legal configuration (over constraining) then the option settings under test will be combined two and two. Combining two option settings will reduce the number of illegal statements by one (i.e. the illegal statement belonging to one of the option settings under test is removed). If this does not help then three option settings under test are combined. This continues until 1) a legal configuration is possible to generate for a combination of option settings or 2) we run out of option settings to combine. If all option settings to test are combined into one configuration and it is still not possible to create a configuration then the next step is to reduce the number of illegal statements that were inserted by comparing option settings in failing and passing configurations (see above). We remove these illegal statements one by one until a configuration is successfully generated.

The more illegal statements that have to be removed and the more of the candidate option settings that have to be combined the less precise the testing of the candidate option settings will be. However, it may also bring us closer to the faulty configuration as it may be that several candidates must be present in a configuration in order to cause the reported failure(s). The information about what combinations of option settings were necessary will be produced as part of the final result as it may provide valuable information to the engineer that will perform the manual debugging. The information about which illegal statements that had to be removed to make create legal configurations will also be provided in the final result as it may also facilitate human debugging. All this information gives the engineer further clues into where the problems may lie.

Once this test suite is created the end-user must run it and check the result whereby he may easily conclude which configuration(s) that are faulty. It is possible that more than one of the configurations in the list is faulty.

This algorithm is not limited to detecting faulty combinations consisting of only one or two common options. This algorithm may find the most likely root cause bug independent of how many options are involved in the common option settings of the failing configurations.

The purpose of this algorithm is to save manual debug time by letting a tool automatically narrow down which option settings that are failing. The algorithm does so by using information from both test passes as well as test failures, because only option settings which are only part of failing tests and not part of passing tests are considered as candidates for containing the root-cause bug. From this list of candidates the algorithm picks out the most likely candidates and in the final step all option settings candidates are tested in different configurations one by one.

In most cases the conclusion of the algorithm will be correct, but there is no guarantee that it always will be correct. For example a temporary problem might have occurred with the IT environment while the test suite was running, causing some tests to fail, which would be incorrectly interpreted by this algorithm as being failures associated with configurations. The fact that the conclusions of this algorithm is not always correct is not an issue as its purpose is to save manual debug time by finding the most likely failing combination of option settings in order to give the engineer a better starting point. However, the algorithm does not remove the need for human interaction in order to conclude where the problem lies and finally to actually fix the bug. This algorithm saves human debug time by pointing out the most probable configurations containing the root-cause bug.

This algorithm may also be used to find faulty file versions in system designs. Large system designs consist of a large number of files and many developers working on different parts of the design. In such systems stability is a problem as a mistake by one of the developers may cause problems for everyone. If an error has been inserted into one of the files in the system then it is important to track it down fast in order to cause minimal disruption, but that is not easy in complex systems. The algorithm described in this chapter may be used to report the combinations of file versions that are the most likely to have caused errors in a non-configurable system in the same fashion as the algorithm is used to report the combinations of option settings that are the most likely to have caused errors in a configurable system. This is achieved by using file names as options and file versions as values. A configuration in this context consists of a list of file names and corresponding versions, e.g:

Configuration 1: -file_alpha 1.3-file_bravo 1.2-file_ceasar 1.1

Configuration 2: -file_alpha 1.1-file_bravo 1.1-file_ceasar 1.0

Configuration 3: -file_alpha 1.1-file_bravo 1.2-file_ceasar 0.9

The test suite (i.e. list of configurations) is tested and its result is analyzed by the algorithm described in this chapter. As previously mentioned, note that this patent does not cover how the list of configurations, i.e. the test suite, is generated. It may be generated for example randomly or by any other algorithm.

A Method and Apparatus for Deducting if a Configuration is Illegal

Some configurations are illegal and may be specified as such by the verification engineer in a list referred to as explicitly declared illegal configurations. For options that are mentioned in two or more of such illegal declarations there is a possibility that different illegal declarations interact and as a consequence some configurations becomes illegal even though they are not explicitly defined in this list. Such configurations are said to be implicitly declared illegal. In order to know whether a configuration should be tested we must first conclude if it is a legal configuration, taking into account both explicit and implicit illegal declarations. Hence what is needed is a method and apparatus for deducting if a configuration is illegal or legal based on a limited list of explicitly declared illegal configurations.

Figure 7:
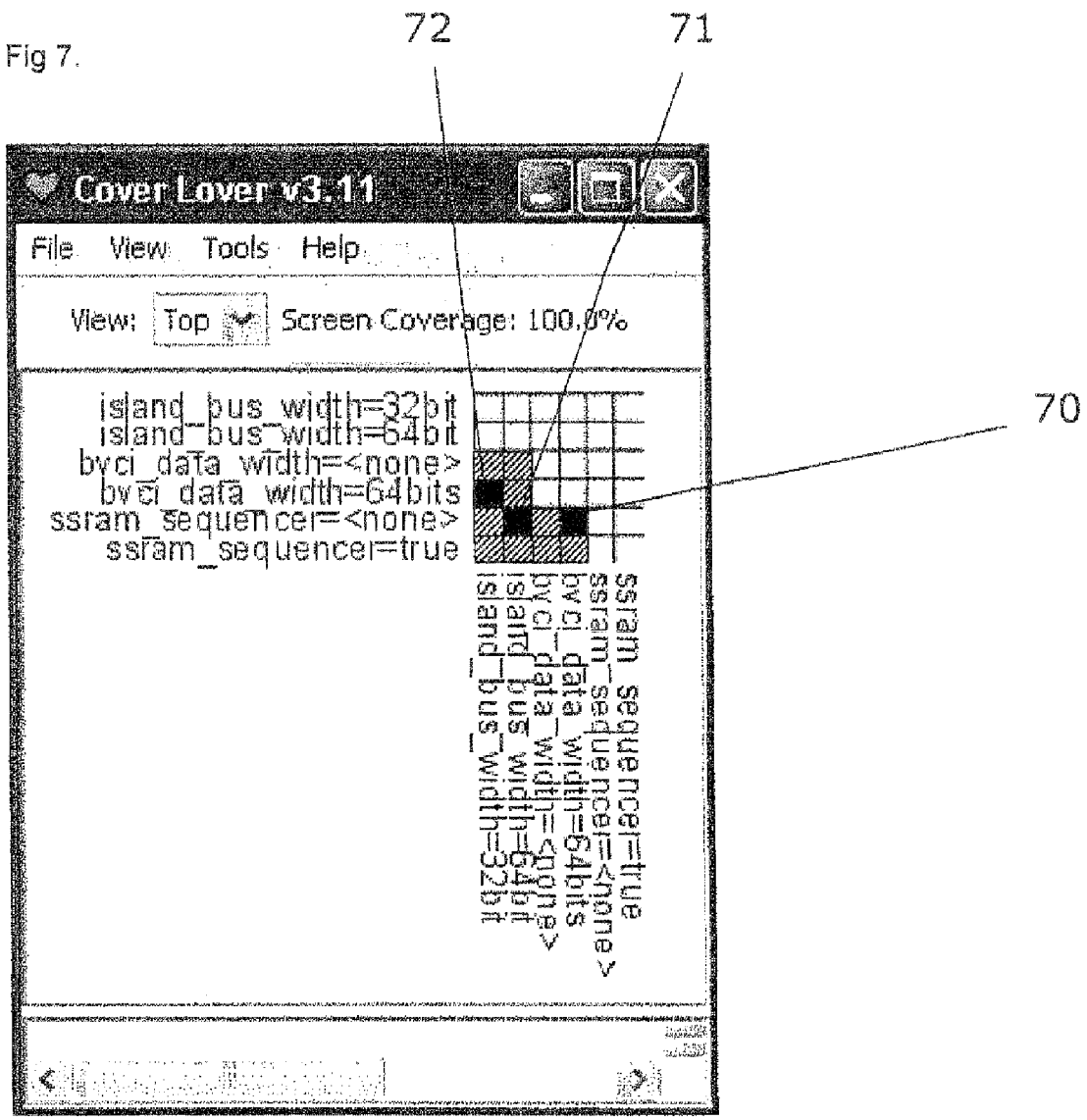
FIG. 7 Example of explicitly and implicitly declared illegal configurations according to the present invention.

In FIG. 7 an example is shown where the illegal configurations are marked black (refer to 70, 71 and 72). In this case the user has specified the illegal configurations in the following manner:

illegal bvci_data_width=64 bits and island_bus_width=32 bit (black square 72 in FIG. 7)

illegal ssram_sequencer=<none> and island_bus_width=64 bit (black square 71 in FIG. 7)

In FIG. 7 the two configurations explicitly declared illegal by the user are the two black squares 71 and 72. However, there is a third black square (70 in FIG. 7) which is also an illegal configuration, but which has not been explicitly declared illegal by the user. This configuration has implicitly been declared illegal by the two explicit illegal declarations by the user. The implicitly illegal configuration (bvci_data_width=64 bits and ssram_sequencer=<none>) is illegal because no value of island_bus_width is possible due to the two explicit illegal declarations.

Detecting all such implicit illegal declarations is of utmost importance in order to be able to achieve full verification coverage. The cover algorithm must be made aware of what configurations that are possible to cover in order not to waste time and effort by trying to cover impossible configurations. Also, when measuring the verification coverage we may only measure the coverage to be full, if those configurations that are illegal are not considered (as they are illegal and thus impossible to cover). If an implicit illegal configuration is not marked as illegal then it will show up as an unverified configuration and this bringing down the verification coverage result.

As a solution to this problem we have invented an algorithm called "iterative legalization", which is an algorithm that may tell whether a configuration is legal or not, taking into account both explicit and implicit illegal declarations. This algorithm is described in FIG. 8 and FIG. 9. Before going into the details, let's start with an overview of the algorithm.

An Overview of the Iterative Legalization Algorithm

Figure 8:
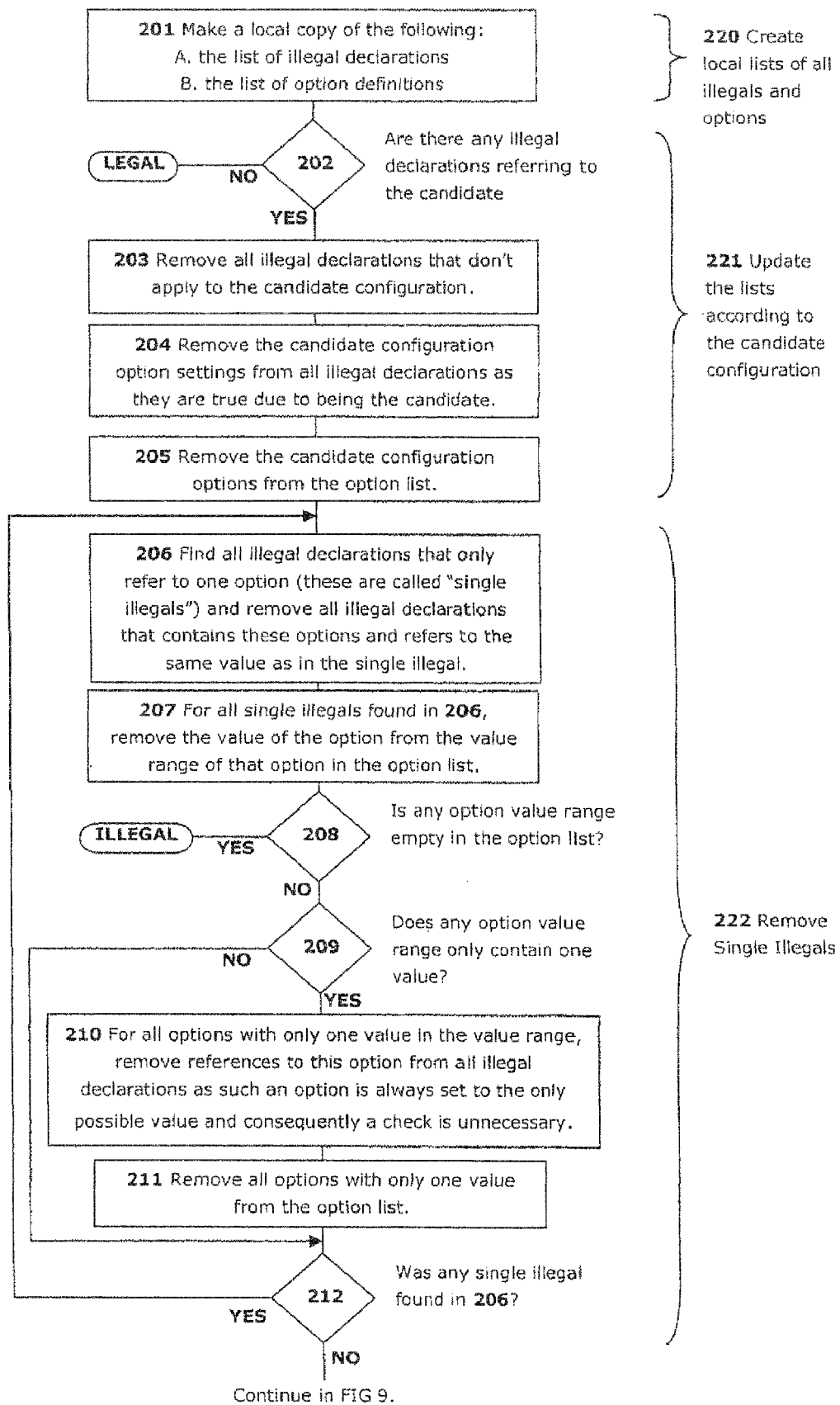
FIG. 8 Iterative Legalization Algorithm—Part 1 according to the present invention.

The first step is to make a local copy of the list of all explicitly declared illegal configurations (refer to "220 Create local lists of all illegals and options" in the right column in FIG. 8). This is the list, specified by the user, declaring which configurations that are illegal. Making a local copy of this list means that there is a copy of the list available to modify as we step through the algorithm, without damaging the original list of explicit illegal declarations which remains unmodified. On top of the list of all explicitly declared illegal configurations (referred to as "list of illegals"), a copy is also made of the list of option declarations. This list ("referred to as "list of options") is also made by the user and it lists all options that should be verified and for each option it lists all values that may be assigned to the option.

The next step is to update these lists according to the candidate configuration (221 in FIG. 8). The candidate configuration is the configuration that should be analyzed in order to tell if it is a legal or illegal configuration, which is the whole purpose of this algorithm. Note that a candidate configuration may consist of any number of options. In this step all illegal declarations should be removed that refer to a different option setting than one of the options in the candidate configuration. E.g. with the candidate configuration set to "mmu=true and xmac=true" then all illegal declarations referring to either "mmu=false" or "xmac=false" should be removed. An illegal declaration stating that the configuration "mmu=false and endianness=big" is illegal, should be removed as it refers to "mmu=false", which may never occur as the candidate configuration has mmu set to true. Note that the entire illegal declaration is removed, which in this example means that as a consequence the option endianness becomes less constrained. If this was the only reference to "endianness=big" in the list of illegals then from now on "endianness=big" is always legal no matter what all other options are set to. This is the core principal of the "iterative legalization"-algorithm: by setting an option to a legal value this reduces the illegal constraints on another option. Such other option may now in turn be set to a value that is legal, which means all illegals referring to the non-legal value of this option may be removed, thus reducing the illegal constraints on yet some other option. In such a way all options are iteratively set to legal values (if possible).

Also in 221 in FIG. 8, the options that form part of the candidate configuration should be removed from both the list of illegals and the list of options. E.g. if the candidate configuration is "mmu=true and xmac=true", then an illegal declaration stating that "mmu=true and multiplier=true" is illegal may be modified to instead state plainly that "multiplier=true" is illegal. The reason being that the first part of the illegal statement "mmu=true" is true as it is the candidate configuration and consequently it is unnecessary to keep this constraint in the illegal declaration.

Finally, also in 221 in FIG. 8, the candidate configuration options are removed from the option list. Every time an option has been set to a value and the list of illegals have been updated the option is removed from the list of options. In the end, the list of options will become empty if all options were successfully set to legal values (in which case the candidate configuration is legal).

Next step is to remove all single illegals (222 in FIG. 8). Single illegals are illegal declarations consisting of only one single option, e.g. an illegal declaration may state that "multiplier=true" is illegal, independent of any other option setting. In this step the single illegal is removed from the list of illegals and the value it refers to is removed from the range of the corresponding option in the list of options. In terms of number of legal configurations, reducing the range of an option is the same as having a larger option range, but with a single illegal declaration forbidding the use of the extra value(s) in the range. Removing single illegals and the associated illegal values in the option ranges, consequently does not change the number of legal configurations, but it does reduce the number of illegal configurations, in a process which is basically a simplification, still expressing the same thing. At the end of this step (222 in FIG. 8) there are no more single illegals left in the list of illegals and the relevant options in the list of options have had their ranges reduced.

Figure 9:
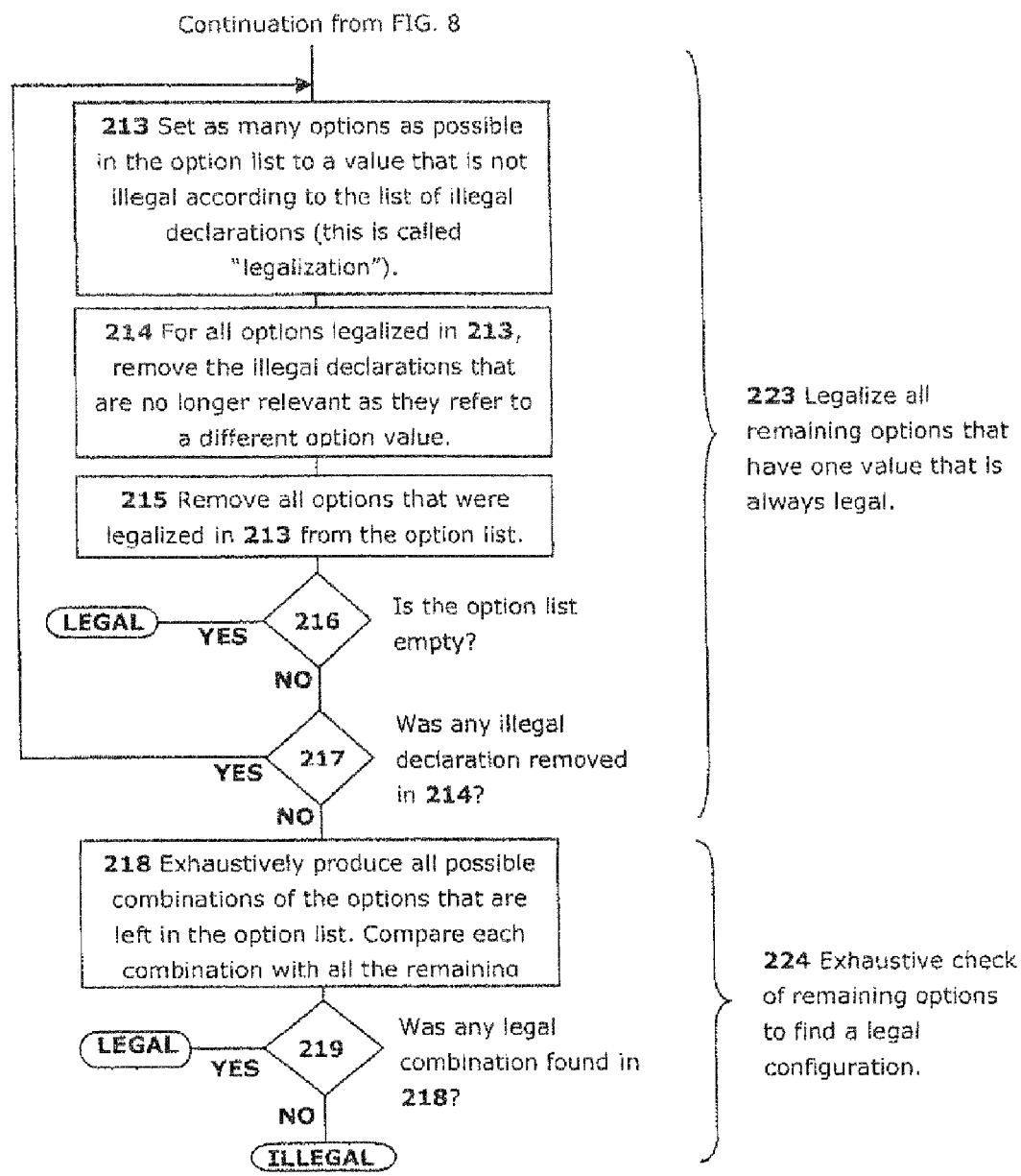
FIG. 9 Iterative Legalization Algorithm—Part 2 according to the present invention.

The next step (223 in FIG. 9) is where all remaining options are legalized. First all options are examined to find those that have one value in its range that is never referred to by any illegal declaration. These options are set to these values, i.e. they are legalized. From here on it works in a similar fashion as in step 221. The illegal declarations that refer to option settings other than those the options are set to are removed. After this has been done, then all legalized options are removed from the list of options. The result of this step (223 in FIG. 9) is a shorter list of options and a shorter list of illegals. As the lists have gotten shorter it is now easier to legalize even more options, which is why we iteratively go back to the beginning of step 223 in FIG. 9 until no more options may be legalized. Step 223 in FIG. 9 is the core of the iterative legalization algorithm.

The final step (224 in FIG. 9) is to examine all the remaining options that could not be legalized, should those exist. In such a case, the remaining illegal declarations refer collectively to all values of the remaining options. It is not possible to set any of the remaining options to a value that mentioned in at least one illegal declaration. It is still possible that all the remaining options may be legalized, but this cannot be done by looking at one option at a time (as was done in 223 in FIG. 9). Instead, we resort to exhaustively test all possible configurations of the remaining options and for each configuration check if it is legal by comparing the configuration against the full list of remaining illegal declarations. As soon as a legal configuration is found then the candidate configuration is declared legal. If no legal configuration is found then the candidate configuration is declared illegal.

A Step-by-Step Explanation of the Iterative Legalization Algorithm

This is a detailed step-by-step explanation of the Iterative Legalization algorithm, where details are described that were not explained in the overview. All numbers below refers to steps in FIG. 8 and FIG. 9.

Step 201 in FIG. 8: The first thing that is done is to make local copy of the list of illegals and the list of options.

Step 202: A check whether there are any illegal declarations referring to the candidate configuration. If not, then the candidate configuration is legal and the algorithm stops. If there are such illegal declarations then more analysis is needed. Go to step 203.

Step 203: Remove all illegal declarations that don't apply to the candidate configuration, e.g. if the candidate configuration is "mmu=true and xmac=true" then all illegal declarations that refer to "mmu=false" or "xmac=false" may be removed.

Step 204: Remove the candidate configuration option settings from all illegal declarations, e.g. if the candidate configuration is "mmu-true and xmac=true" then the illegal declaration "mmu=true and multiplier=true" may modified to simply state that "multiplier=true" is illegal. The reason being that the candidate configuration is set to "mmu=true" and consequently it is unnecessary to check whether this is true, because for this candidate configuration it is always true.

Step 205: After steps 203 and 204 there are no longer any references to the candidate configuration options in the list of illegals. In this step the candidate configuration options are removed from the list of options. By end of step 205 the candidate configurations options have consequently been completely processed.

Step 206: Find all illegal declarations that only refer to one option (referred to as "single illegals") and remove all illegal declarations that contains these options and refers to the same value. This includes removing the single illegal itself from the list of illegals. E.g. if there is a single illegal stating that "multiplier=true" is illegal then another illegal stating that "multiplier=true and xmac=true" is illegal may be removed, because the latter illegal declaration is a sub-set of the single illegal statement. At the same time the single illegal itself ("multiplier=true") should be removed as well.

Step 207: For all single illegals found in step 206, remove the corresponding option values from their ranges. E.g. for the single illegal "multiplier=true" then the option range of "multiplier" should be reduced from "true, false" to only "false", consequently preventing option "multiplier" from ever be set to "true" and thereby removing the need for a single illegal declaration to prevent such a setting to occur. No change has occurred to the list of legal configurations, but the list of legal configurations is now declared with more precision, with a reduced number of illegal declarations and smaller option ranges.

Step 208: Has any option range become empty in step 207? If that is the case then the candidate configuration is illegal as it is not possible to find a legal value on one of the options. If there is no empty option ranges then proceed to step 209.

Step 209: Does any option value range contain only one value? If yes, then we may do some further simplifications in step 210. If no, then skip these simplifications and jump directly to step 212.

Step 210: For all options with only one value in its options range, remove all references to this option from all illegal declarations as such a check may never be false. There are no other values that such an option may take. E.g. if the option "multiplier" only has the value "false" in its range of allowed values, then an illegal declaration such as "multiplier=false and xmac-false" may be modified to just state that "xmac=false" is illegal as the first part of the illegal declaration, "multiplier=false", is always true due to lack of other allowed values for the option "multiplier".

Step 211: After all references to options with only one value in its options range have been removed in step 210 then the option itself is removed from the option list in this step. E.g. using the same example as in step 210, the option multiplier would be removed from the option list in this step.

Step 212: Were any single illegals found in step 206? If yes, then a reduction of the illegal list has occurred. This in itself may have produced some new single illegal declarations, which is why the next step is to go back to 206 and look for more single illegals. If no single illegals were found in 206 then there are no more single illegals to remove and the next step is to go to 213 in FIG. 9.

Step 213 in FIG. 9: Set as many options as possible in the option list to a value that is not illegal according to the list of illegal declarations, This is called legalization of options. E.g. the option "endianness" may be set to "big" if there are no illegal declarations referring to "endianness=big". In this example the option endianness is legalized by setting it to the value "big".

Step 214: For all options that were legalized in step 213, remove all illegal declarations that are no longer relevant as they refer to a different option value. E.g. if the option "endianness" was legalized by setting it to the value "big", then an illegal declaration stating that "endianness=little and mmu=true" may be removed from the list of illegals as this illegal declaration refers to another value on endianness than it has just been set to in 213.

Step 215: Remove all options that were legalized in step 213. E.g. if the option "endianness" was legalized in step 213 then remove the option "endianness" from the list of options.

Step 216: Is the option list empty? If yes, then all options have been legalized, which means that the candidate configuration is legal. If no, then further analysis is required and the next step is 217.

Step 217: Was any illegal declaration removed in 214? If yes, then the list of illegals have been reduced, which increases the possibilities of legalizing options. In order to check whether any new option may be legalized thanks to this, the algorithm iterates back to step 212. However if the answer is no, then the next step is 218.

Step 218: When this step is reached then all options have been legalized that could be set to a value that was not used by any illegal declaration in the remaining list of illegals. However there are some options left that could not be legalized in this fashion. That does not mean that these option cannot be legalized at all, it just means that a combination of two or more option settings are required to find legal values for the remaining options. Each option may no longer be analyzed by itself (which has been the case up to step 217 in the algorithm). In this step (218 in FIG. 9) all combinations of the remaining options are exhaustively produced and each such combination is checked against the entire remaining list of illegals to see if any combination is legal.

Step 219: If a legal combination was found in 218, then the candidate configuration is legal, otherwise it is illegal.

Figure 10:
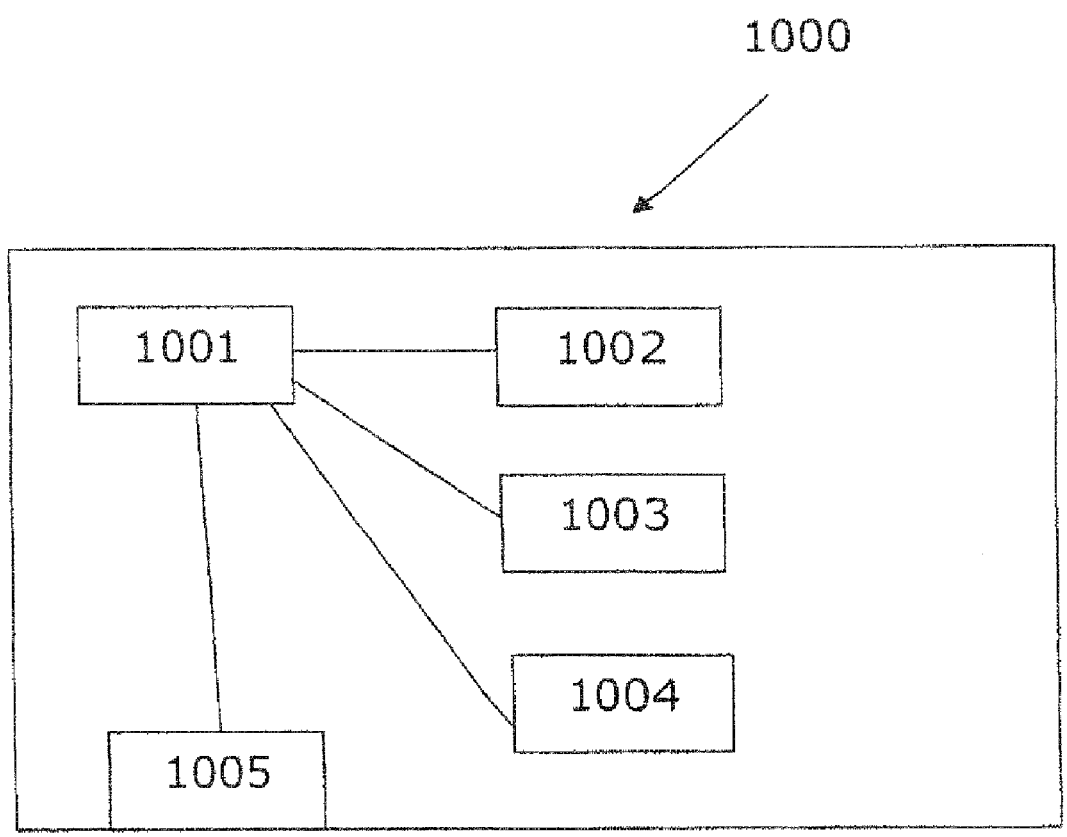
FIG. 10 shows schematically a device according to the present invention.

FIG. 10 shows a device 1000 implementing the solution according to the present invention. The device may comprise a computational unit 1001, such as a microprocessor, digital signal processor, FPGA (Field programmable gate array), ASIC (application specific integrated circuit), a volatile memory unit 1002 (such as RAM memory or suitable type), optionally a non-volatile memory unit 1003 (e.g. a hard disk, Flash disk, ROM, EEPROM or similar), and optionally a communication interface (e.g. an Ethernet interface) 1005. Furthermore, the device may comprise a user interface unit 1004 for handling user interface such as receiving commands using user interface peripheral equipment and displaying results on a display device (not shown).

It should be noted that the word "comprising" does not exclude the presence of other elements or steps than those listed and the words "a" or "an" preceding an element do not exclude the presence of a plurality of such elements. It should further be noted that any reference signs do not limit the scope of the claims and that several "means" or "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A method for displaying and measuring verification coverage for a test suite aimed at verifying configuration options, comprising the steps of:

receiving a list of configuration options that the user wishes to examine;

receiving a list of combinations of configuration options that the user will test;

analyzing the lists and displaying the verification coverage for each combination of two configuration options;

analyzing the lists and measuring the verification coverage for all combinations and presenting the result as a measurable;

receiving a signal from a user indicating settings on some of the configuration options, which the user wishes to focus on;

analyzing the lists and displaying the verification coverage for each remaining combination of two configuration options, given that the other configuration options have been set to specific values;

analyzing the lists and measuring the verification coverage for all remaining combinations, given that the other configuration options have been set, and presenting the result as a measurable; and updating at least one memory unit area with a result of the analysis.

2. The method according to claim 1, further comprising the steps of:
   receiving a list of configuration options that the user wishes to examine;
   receiving a list of combinations of configuration options that the user will test;
   receiving a list of values of N for which the user wishes to measure the N-way verification coverage;
   receiving a number from the user indicating how many different views that should be measured per value of N;
   generate the views that should be measured for each N;
   receiving the analysis result from claim 1 for each of these views; and
   updating at least one memory unit area with a result of the analysis.

3. A device arranged with at least one processing unit, at least one memory unit, wherein the device is arranged to perform at least the method of claim 1.

4. A system comprising at least one device according to claim 3, a user interface unit, and a communications unit.

5. A computer program stored in a non-transitory computer readable storage medium, sufficient to cause a computational unit comprising a processor and a memory to perform at least the method of claim 1.

* * * * *